Jan. 12, 1932. R. S. KIRK 1,841,331
METHOD OF AND APPARATUS FOR CONSTRUCTING TIRE BEADS
Filed Sept. 10, 1927 6 Sheets-Sheet 3

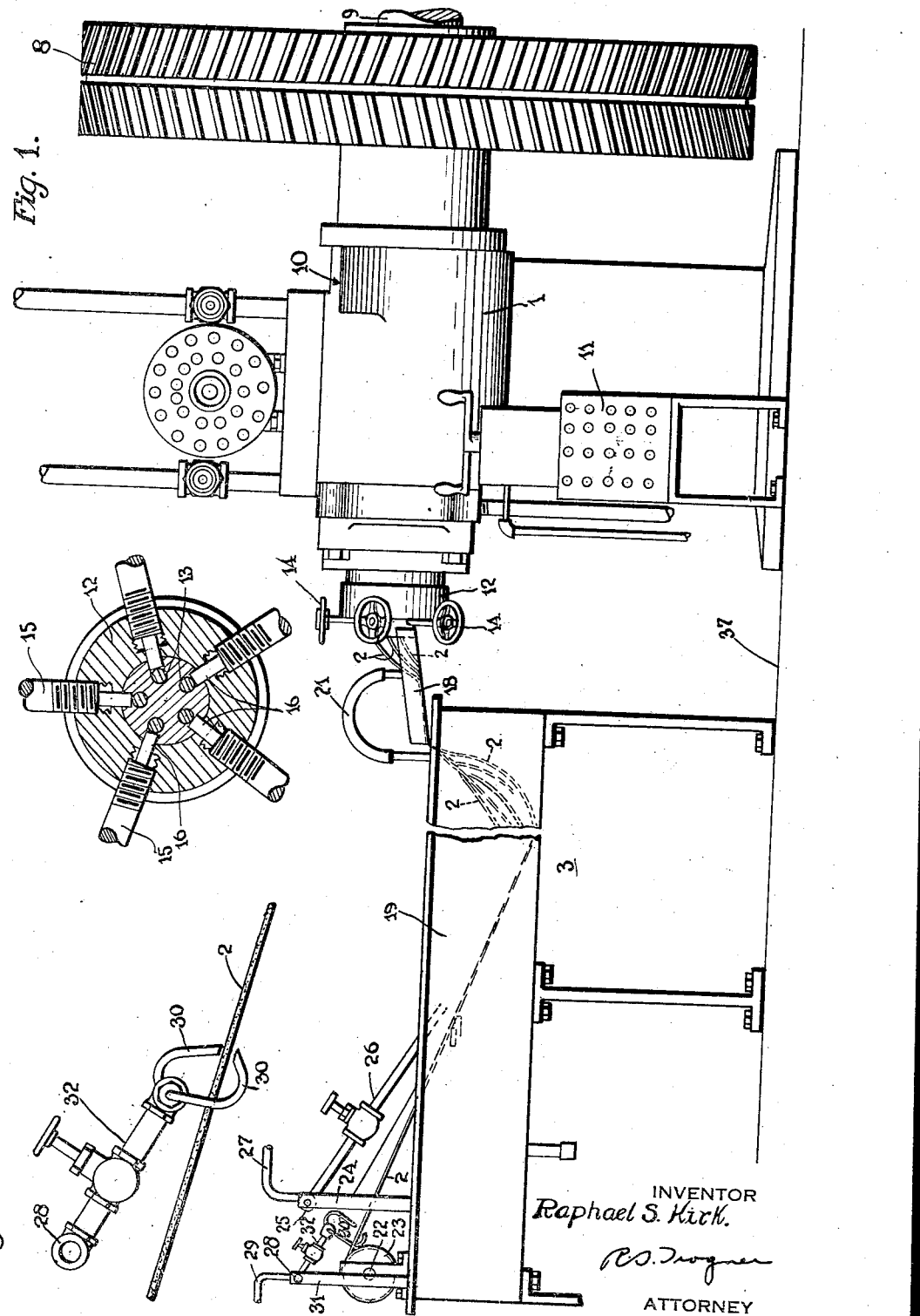

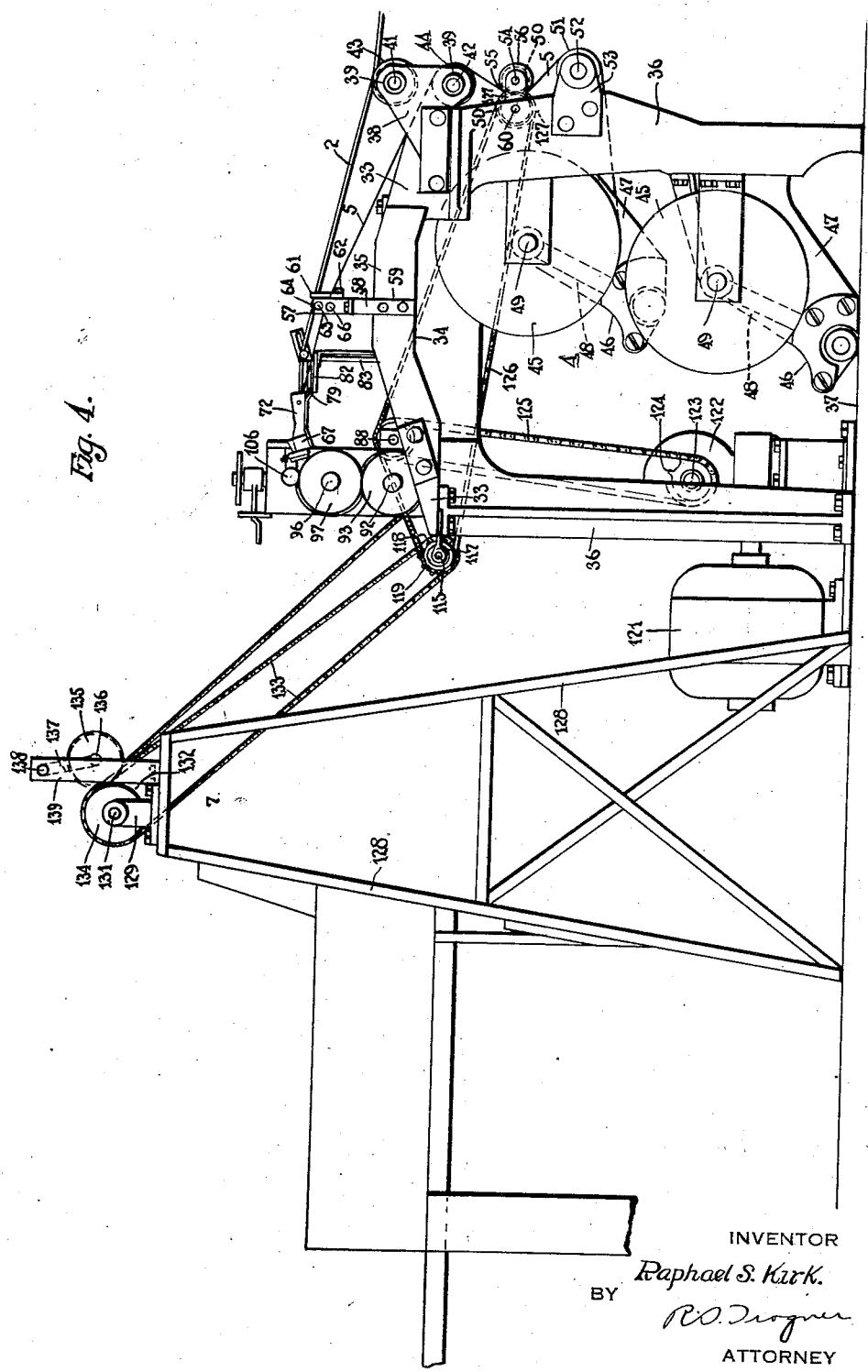

INVENTOR
Raphael S. Kirk.
ATTORNEY

Jan. 12, 1932.                R. S. KIRK                1,841,331
       METHOD OF AND APPARATUS FOR CONSTRUCTING TIRE BEADS
                    Filed Sept. 10, 1927      6 Sheets-Sheet 4
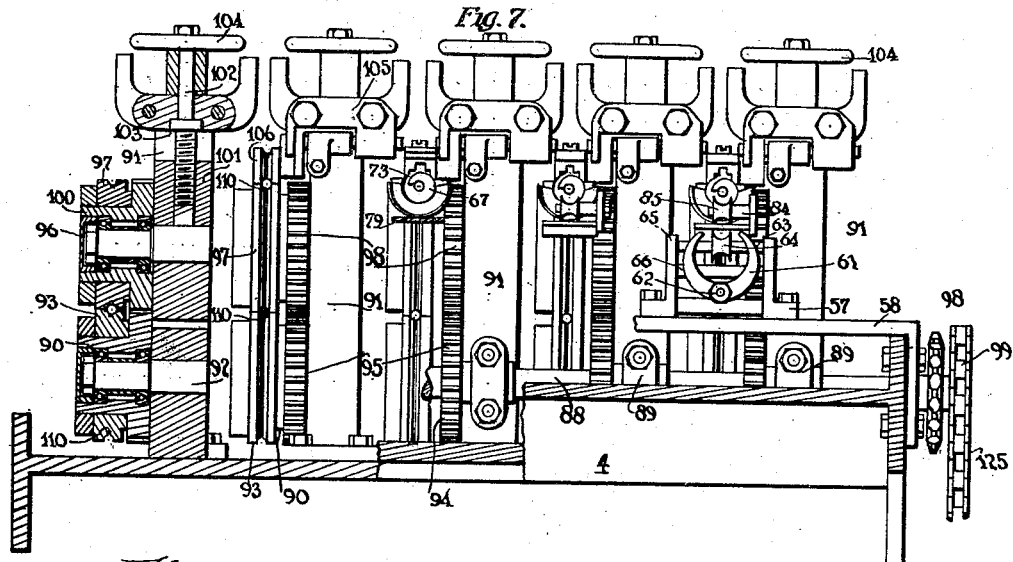
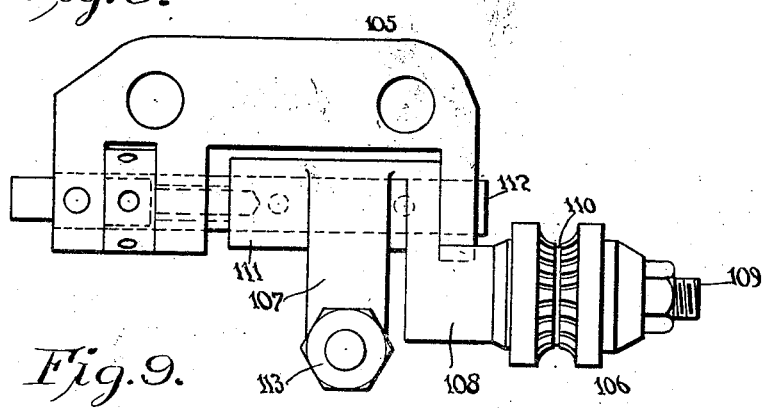
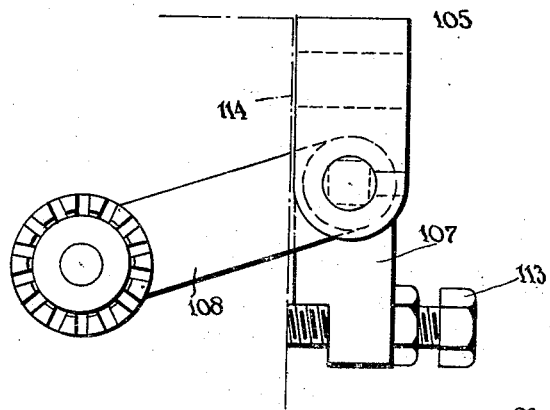
Inventor
Raphael S. Kirk.
By
Attorney Jan. 12, 1932. R. S. KIRK 1,841,331
METHOD OF AND APPARATUS FOR CONSTRUCTING TIRE BEADS
Filed Sept. 10, 1927 6 Sheets-Sheet 5

INVENTOR
Raphael S. Kirk.
BY
ATTORNEY

Jan. 12, 1932. R. S. KIRK 1,841,331
METHOD OF AND APPARATUS FOR CONSTRUCTING TIRE BEADS
Filed Sept. 10, 1927 6 Sheets-Sheet 6
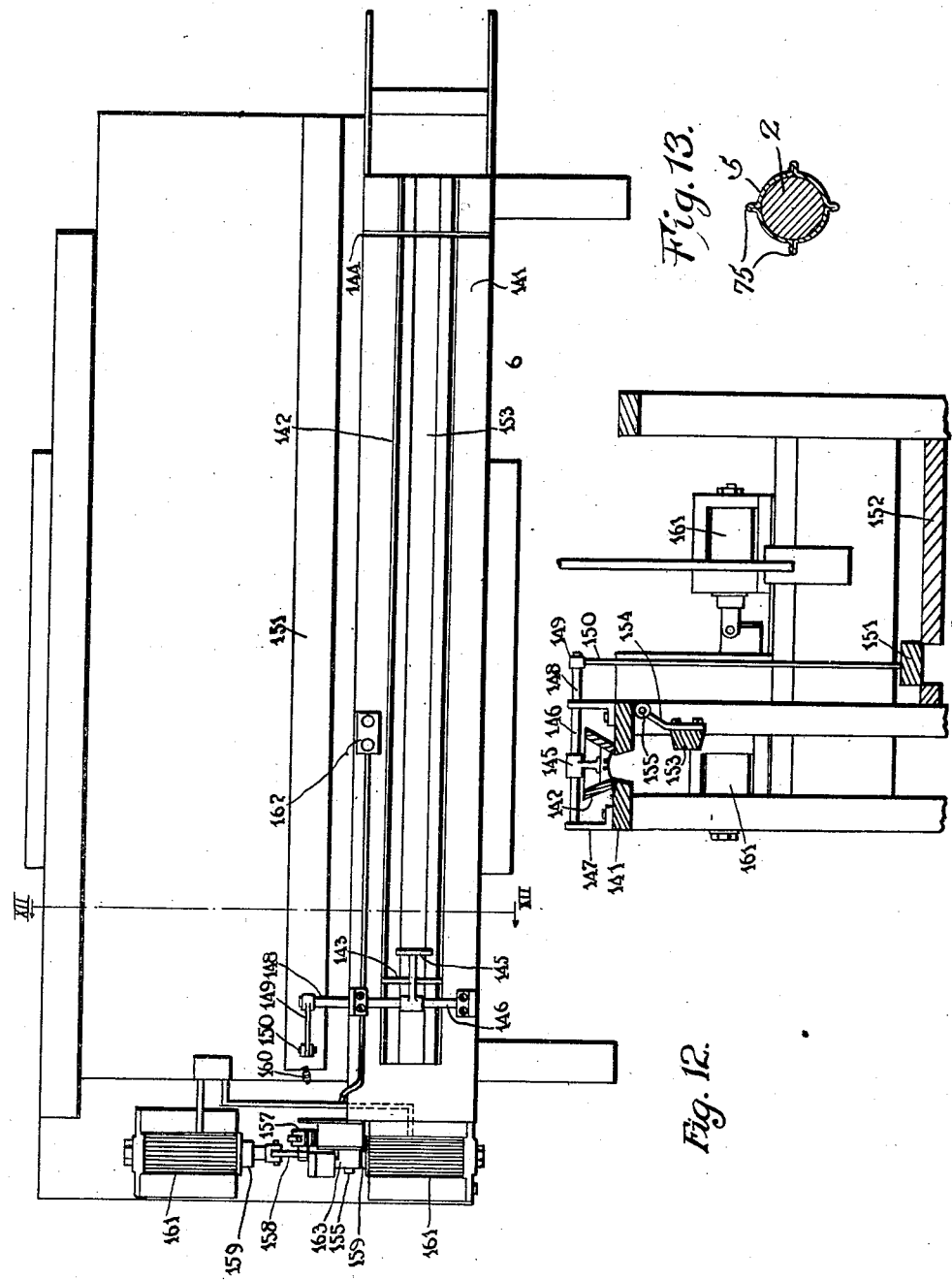

Patented Jan. 12, 1932

1,841,331

UNITED STATES PATENT OFFICE

RAPHAEL S. KIRK, OF AKRON, OHIO, ASSIGNOR TO THE GOODYEAR TIRE & RUBBER COMPANY, OF AKRON, OHIO, A CORPORATION OF OHIO

METHOD OF AND APPARATUS FOR CONSTRUCTING TIRE BEADS

Application filed September 10, 1927. Serial No. 218,824.

My invention relates to an apparatus for and a method of constructing tire beads and it has particular relation to apparatus for forming clincher tire beads in continuous lengths.

One object of the invention is the provision of an apparatus comprising related instrumentalities capable of functioning together to produce simultaneously a plurality of beads for tires.

Another object of the invention is to provide a novel apparatus whereby a plurality of lengths of fabric may be progressively formed about and stitched to a plurality of cores to form therewith continuous lengths of tire bead ready for curing.

A further object of the invention is to provide an automatic apparatus by means of which a plurality of tubes of core material may be simultaneously extruded from an extrusion device and a plurality of strips of covering material caused to be progressively formed about the respective tubes to produce a plurality of continuous lengths of bead ready for curing.

Another object of the invention is to provide an apparatus for covering a length of core material fed thereto with fabric in such manner that there is a surplus of covering material arranged in longitudinally extending ridges along the core to compensate for change of form of the core during vulcanization.

With these and other objects in view, my invention consists of the novel features of construction of various instrumentalities, the combinations of elements and arrangement of parts and the novel steps in the method hereinafter described and pointed out in the claims.

In accordance with the present practice of forming clincher beads for tires a single core of material is extruded and is covered or wrapped with fabric which closely engages the core at all points. In some instances the material is spirally wound about the core and is then stitched into position thereon. Although these methods produce beads which have been reasonably satisfactory, the rate of production of such beads has been objectionably low. Moreover, a material percentage of the beads thus produced has been defective by reason of rupture of the wrap caused by change in form of the core during vulcanization.

My inventive concept involves the simultaneous extrusion of a plurality of continuous lengths of core material, the enclosing of the several cores simultaneously within a plurality of strips of wrapping material, the forming of each enclosing wrapper so as to provide one or more longitudinal ribs of surplus material to compensate for change in form of the core during vulcanization, the feeding of the several lengths of covered beads into position for severing, and the discharging of the beads, cut to length, from the apparatus.

In the accompanying drawings:

Fig. 1 is a side elevational view illustrating mechanism for simultaneously extruding and cooling a plurality of continuous lengths of bead core material in accordance with my invention;

Fig. 2 is a detail view, partially in section and partially in elevation, of a portion of a die structure of the tubing machine shown in Fig. 1;

Fig. 3 is a detail view in side elevation illustrating a portion of the core cooling mechanism shown in Fig. 1;

Fig. 4 is a side elevational view illustrating apparatus for progressively covering a bead core and for feeding the covered core to a cutting table;

Fig. 7 is a view, partially in section and partially in front elevation, of a portion of the bead wrapping and shaping apparatus, parts of each of the similar units of the machine being removed to illustrate the relation of other parts;

Fig. 8 is a detail view in side elevation illustrating a stitching roll and an adjustable mounting therefor;

Fig. 9 is a similar view in end elevation of the structure shown in Fig. 8;

Fig. 11 is a top plan view of the structure shown in Fig. 10;

Fig. 12 is a sectional view taken substantially along the line XII—XII of Fig. 11; and Fig. 13 is a transverse sectional view of the covered bead.

Figure 5:
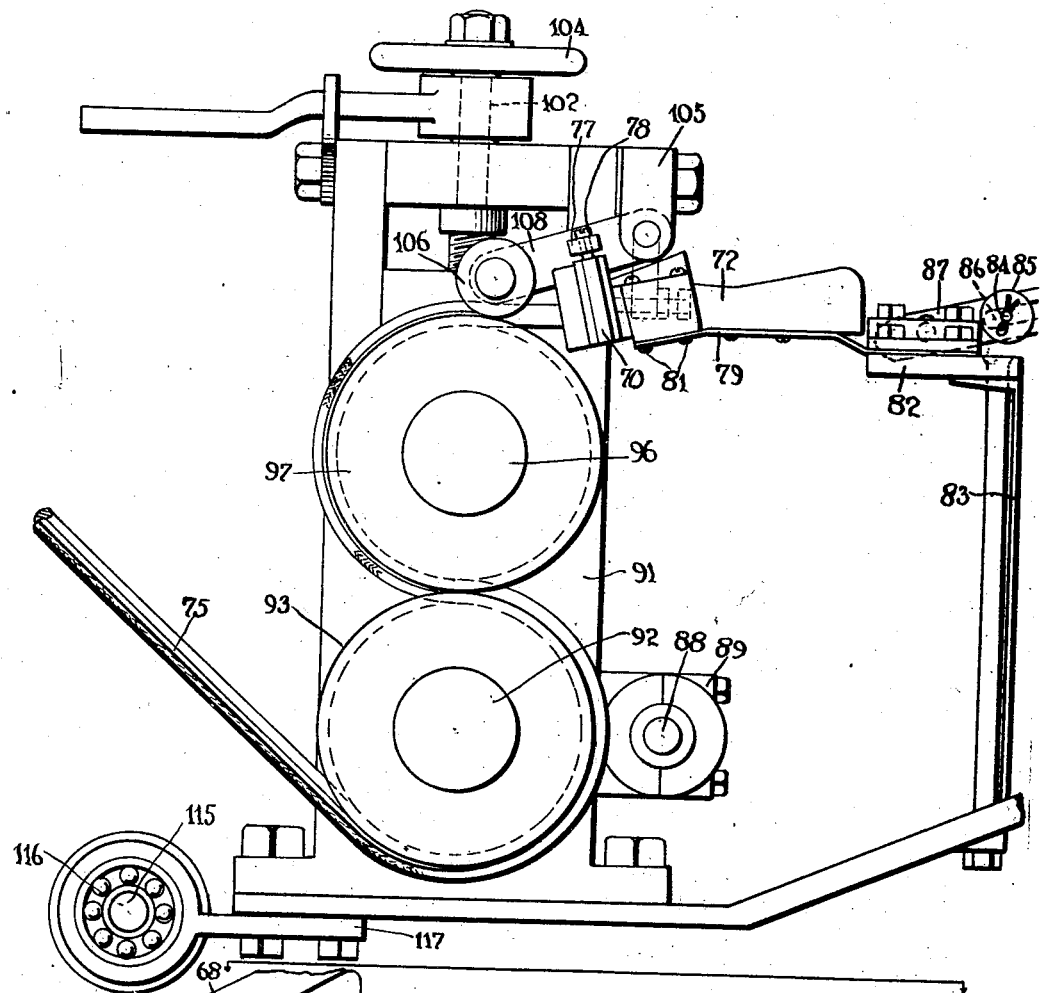
Fig. 5 is an elevational view on a larger scale of a portion of the core-wrapping and stitching apparatus shown in Fig. 4.
Figure 6:
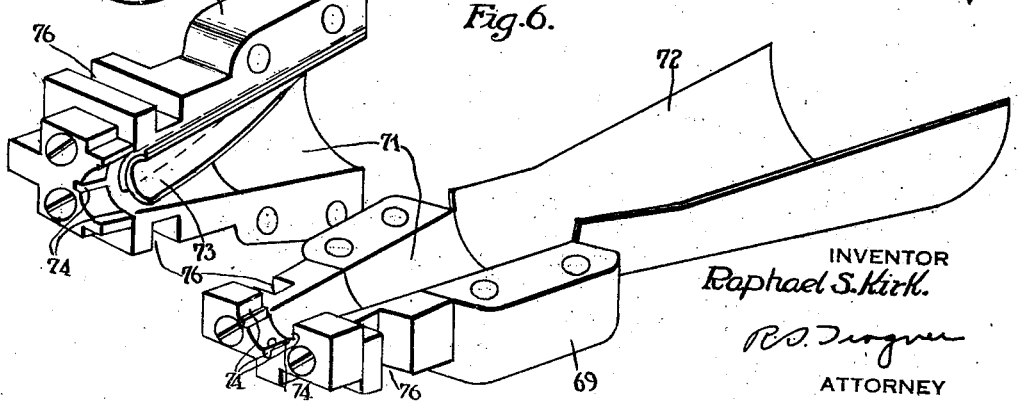
Fig. 6 is a perspective view illustrating in disassembled relation the two parts of the bead wrapping and shaping die.
Figure 10:
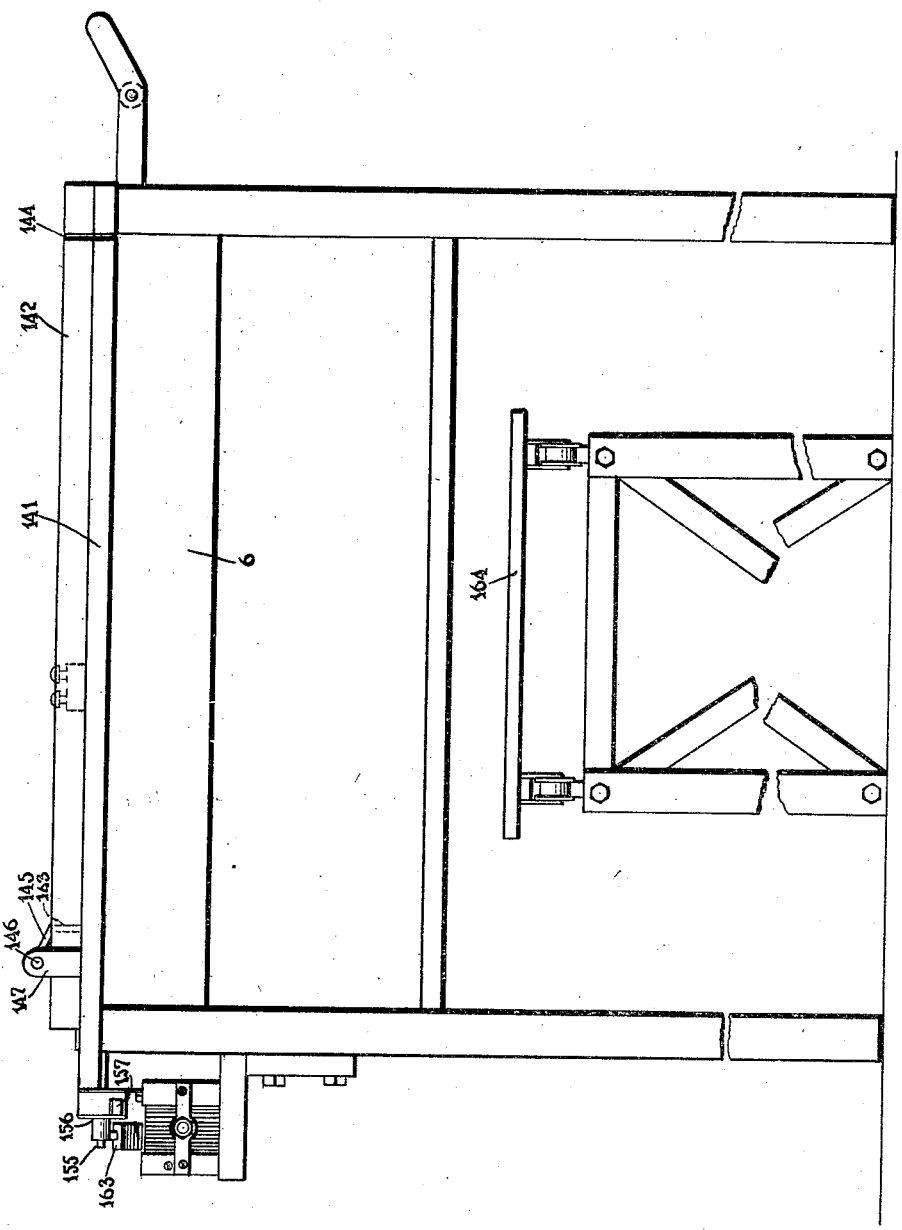
Fig. 10 is a side elevational view of a cutting table and mechanisms for holding beads during a cutting operation and for discharging the cut beads.

The apparatus involved in the particular embodiment of my invention illustrated in the accompanying drawings, broadly considered, comprises; an extrusion device 1 capable of delivering a plurality of continuous lengths 2 of bead core material; an apparatus 3 for cooling the bead material as it is extruded; a combined wrapping and stitching device 4 which draws the lengths of bead core from the cooling apparatus, progressively encloses these lengths within strips 5 of material, and stitches the material to the cores; a cutting apparatus 6 by means of which covered cores may be severed to length and discharged; and an instrumentality 7 for positively feeding the covered cores from the wrapping and stitching device to the cutting apparatus.

The extrusion device 1, which is, for the most part, conventional and need not, therefore, be described in detail herein, is preferably driven by a motor (not shown), operatively connected in the usual manner to a large driving gear 8 secured to a main driving shaft 9 of the device, operation of the motor being governable by a controller 11 disposed adjacent the machine.

Means is provided whereby a plurality of continuous lengths 2 of core material may be simultaneously delivered by the extrusion machine. As shown, this means comprises a die 12 provided with a plurality of spaced ports 13, which may be closed independently by operating a hand wheel 14 mounted upon a shaft 15 threaded into the die and having a reduced end 16. The strips 2 of extruded material are guided by a trough or chute 18 into a cooling tank 19, which is at all times partially filled with cold water that flows into the tank from a water service pipe 21. On the end of the tank 19 a shaft 22 is rotatably mounted to which a plurality of spaced grooved wheels 23 are secured that serve to guide the cores from the tank.

In order to aid in the cooling of the cores as they pass through the tank 19, means is provided for discharging streams of water and streams of air upon each individual core. As shown, this result is obtained by upstanding brackets 24 secured to opposite sides of the tank which support a water pipe 25 having individual valve-controlled nozzles 26 extending therefrom to points adjacent the respective lengths 2 of core material, the pipe 25 being connected to a suitable source of water supply by a pipe 27.

An air pipe 28, connected to a suitable source of air supply by a pipe 29, is supported by brackets 31 above the guide rolls 23 and has extending therefrom a plurality of branch valve-controlled pipes 32 projecting toward the several lengths 2 of core material. Each of the individual pipes 32 is provided with a pair of smaller pipes 30 curved so that they direct air against the top and bottom, respectively, of the bead core. The combined effect of the streams of cold water and air upon the cores is to cool them sufficiently so that they are in condition to be covered by the wrapping and stitching apparatus 4.

As shown, the core wrapping and stitching apparatus 4 includes a substantially rectangular table or platform 33 which is preferably arched centrally, as indicated at 34, and is formed with integral upstanding flanges 35 along two sides thereof. The platform 33 is supported in a horizontal plane slightly above the level of the top of the cooling tank 19 by vertical standards 36 bolted at opposite ends to the platform 33 and to the bed plate 37 of the combined machine.

A plurality of brackets 38, secured to opposite sides of the platform 33, are provided with bearings 39 in which transverse shafts 41 and 42 are journaled. The shaft 41 has grooved guide wheels 43 mounted thereon in spaced relation and in alignment with the respective wheels 23 on the shaft 22. The wheels 43 serve to guide the continuous lengths 2 of core material and a plurality of broad pulleys 44, carried in a similar manner by the shaft 42, serve to guide the strips 5 of material from supply rolls 45 disposed beneath platform 33.

Two tiers of supports 46 are provided for the rolls 45, one above the other. Each support 46 preferably comprises a web or partition member 47 which is bolted to the machine frame and has the lower end of a bar 48 pivotally connected thereto. The upper or free end of the bar 48 has a stud shaft 49 projecting laterally therefrom upon which a roll 45 of material is mounted. The pivotal mounting of the bar 48 makes it possible to swing the free end thereof outwardly away from the member 47 so that a roll 45 may be mounted on the stud shaft 49 and then be moved back between adjacent partition members. The arrangement of the roll supports 46 in two tiers makes it possible to mount a new roll 45 on one of the supports while the roll carried by the companion support is being utilized and thus permit continuous operation of the apparatus.

Means is provided for directing the travel of the strips 5 of material from the rolls 45 to the guide pulleys 44 and, as shown, comprises a plurality of spaced pulleys 51 carried by a freely rotatable shaft 52 having suitable bearing in brackets 53 secured to opposite sides of the machine. Substantially midway between the shafts 42 and 52 is mounted another shaft 54 which has suitable bearing in brackets 55 bolted to the frame. A single long roll 56 is mounted on the shaft 54, the ends of which align with the outer ends of the outermost pulleys 44 and 51. This roll is preferably covered with, or entirely formed of, fabric so that it will have a tendency to grip the strips 5 as they pass thereabout and it is positively driven through the agency of a pair of gear wheels 50 mounted, respectively, on the shaft 54 and on a stud shaft 60 journaled in the frame 36.

Other core and material guiding means are provided and, as shown, comprise individual upstanding brackets 57 of U-shape secured to an inverted support 58 of U-shape having its spaced arms 59 bolted to the side flanges 35 adjacent the center of the arched portion 34 of the platform 33. A pair of relatively movable curved guide fingers 61 are pivotally attached adjacent their ends at a common point 62 to the center of each of the brackets 57. A shaft 63 having a small grooved wheel 64 fixed to its central portion is rotatably mounted in suitable bearings adjacent the top of the arms 65 of the brackets and a roller 66 is rotatably mounted between the arms 65 directly below the shaft 63. The fingers 61 and roller 66 are instrumental in guiding the strips of material 5, and the wheels 64 guide the cores 2 into position for action thereon by the die and stitching mechanisms.

The strips 5 of material are formed about the cores by means of a plurality of dies 67 each formed of an upper section 68 and a lower section 69, which are grooved, as indicated at 71, so that a conical passage is formed between them when they are secured together in operative position.

As shown, the section 69 is formed with a curved guide plate 72 which serves to cause the edges of a strip 5 passing therethrough to move gradually upwardly toward each other and a curved plate 73 extends into the groove 71 of section 68 so as to cause a gradual overlapping of the edges of the strip. In order to prevent the strip 5 from engaging the core tightly at all points, recesses 74 are formed at diametrically opposite points of the smaller end of the conical passage defined by the sections 68 and 69. Longitudinal ridges 75 of surplus material 5 are formed free of the core 2 by the entry of portions of the fabric into the recesses or grooves 74 as the fabric is wrapped about the core.

The two sections of the die are secured together by a U-bolt 70 engaging in slots 76 formed in the exterior of the sections and a cross plate 77 having its ends made fast to the respective ends of the bolt 70 as by machine screws 78. The dies 67 are preferably secured in operative position in the machine by means of a transverse plate 79, to which the sections 69 of the several dies are fastened, as by machine screws 81, and the plate 79 is, in turn, mounted upon a heavier plate 82 carried by a supporting member 83 of L-shape upstanding from the machine frame. Short shafts 84, each carrying a grooved guide wheel 85, are adjustably supported in spaced relation to the plate 82 by having an end of each shaft rotatably and slidably mounted in a slot 86 formed in a bracket 87 secured to the plate 82.

A shaft 88, rotatably mounted in bearings 89 secured to a plurality of frame members 91 upstanding from the platform 33, serves to drive sleeves 90 rotatably mounted on a stationary shaft 92 that has suitable support in the frame 91. A plurality of stitcher rolls 93 are carried by the sleeves 90 and are rotated through the engagement of gears 94 and 95 on the shaft 88 and sleeves 90. A shaft 96, mounted in a similar manner directly above the shaft 92, carries sleeves 100 supporting a plurality of stitcher rolls 97 in coacting relation to the stitcher rolls 93 and the sleeves 100 are driven by the engagement of gears 98 mounted thereon with the gears 95 on the sleeve 90. The shaft 88 projects past the machine frame and has mounted thereon two sprocket gears 98 and 99.

As shown, the shaft 96 is adjustable with respect to the shaft 92 by means of collars 101 mounted thereon. It will be observed that one of these collars is provided adjacent each of the upstanding frame members 91, with shafts 102, threaded at their lower ends into the collars. They also have shoulders 103 intermediate their length, which bear upon the under side of the frame members and are provided with hand wheels 104 for rotating the shafts 102 to raise or lower the shaft 96.

Supporting brackets 105 are secured to each of the frame members 91 and adjustably support small stitcher rolls 106 for coaction with the respective stitcher rolls 97. An adjusting arm 107 and an arm 108, carrying a stud shaft 109 on which the stitcher roll is mounted, project angularly from a collar 111 rotatably mounted on a shaft 112 carried by the bracket. A set screw 113 threaded through the lower end of the arm 107 has its inner end in engagement with a portion 114 of the frame member 91 and may be adjusted to vary the height or the position of the stitcher roll 106 with respect to the stitcher roll 97.

A shaft 115 is rotatably mounted preferably in ball bearings 116 carried within brackets 117 secured to the opposite sides of the platform 33. This shaft extends somewhat past the supporting bracket 117 at one end and carries thereon two sprocket wheels 118 and 119.

A motor 121 drives, through a speed reduction device 122, a shaft 123 on which a sprocket wheel 124 is secured. A sprocket chain 125 passes over this wheel and over sprocket wheel 99 to drive the main shaft 88 of the wrapping and stitching apparatus. An endless sprocket chain 126 is trained about the sprocket wheels 98, 118, and a sprocket wheel 127 secured to the shaft 60, thus providing a complete driving connection to the several shafts of the machine.

Juxtaposed to the wrapping and stitching apparatus, and secured to the same bed plate 37 is a tower-like frame 128, which supports spaced brackets 129, in which a shaft 131 is journalled, one end of which extends past its supporting bracket and carries a sprocket wheel 132 driven by a chain 133 passing thereover and over the sprocket wheel 119 on the shaft 115. A plurality of grooved wheels 134 are disposed on the shaft 131 in alignment with the stitching rolls of the wrapping and stitching device. Pressure rolls 135, which coact with the wheels 134 to positively draw the covered cores forward, are rotatably mounted on short shafts 136 carried at the lower end of arms 137 pivotally joined to a shaft 138 supported by uprights 139 mounted at opposite sides of the frame.

Preferably and as shown, the mechanism whereby the several covered cores may be simultaneously skived to length and discharged from the apparatus comprises a table 141 having a pair of elongate side members 142 disposed thereon in spaced relation to form a trough therebetween. A stop or abutment member 143 is adapted to be positioned at different points within the trough so that an operator may dispose the ends of the cores thereagainst and sever the cores by passage of a knife (not shown) through a slot 144 provided in the members 142, to sever the cores into sections of predetermined length.

Means is provided for holding the ends of the cores down in position for severance against the abutment 143 during the cutting operation, and comprises a pressure arm 145 extending from a transverse shaft 146 journalled in upright brackets 147 at opposite sides of the table and extending past one of the brackets, as indicated at 148. A second arm 149 secured at one of its ends to the projecting end 148 of the shaft 146, has its other end pivotally joined to an upright rod 150, which is secured at its lower end to one end of a freely movable member 151 in a platform 152 provided adjacent to the table. It will be observed that downward pressure upon the member 151 will cause a rotation of the shaft 146 which, in turn, will raise the pressure arm 145 to permit positioning of the ends of the cores thereunder, and that upon release of the pressure from the member 151 the weight of the arm 145 is such as to retain the ends of the cores in position. A spring 160 having its ends secured to the member 151 and to the frame, respectively, is provided normally to retain the member 151 in elevated position.

The means for discharging the severed beads from the apparatus comprises a movable bottom 153 for the trough which is carried at the free ends of bent arms 154, that have their other ends secured to a controlling shaft 155. Adjacent the end of this shaft is mounted a pinion 156 which coacts with a rack 157, which is so supported as to be movable with a shaft 158 connecting the cores 159 of a pair of solenoids 161 mounted beneath the table.

A push button 162, provided at a convenient point along the table, has suitable electrical connection to the solenoids and to a source of electrical energy (not shown), so that the operator may cause movement of the rack 157 in either direction and a resulting movement of the bottom 153 of the trough. If desired, and as shown in Fig. 11, a weighted arm 163 may be secured to shaft 155 to bias the shaft toward the position in which the bottom 153 is closed. A truck 164 may be positioned beneath the trough to receive the cut beads therefrom.

In the operation of the apparatus above described, the material from which cores are to be formed is continuously fed into the extrusion device through an opening 10, and continuous lengths 2 of core material (which in the device, as shown, may be any desired number from one to five) are extruded therefrom upon the chute 18, which conveys them into the cooling tank 19. The tank is, of course, long enough that the beads travel some considerable distance in the water and the beads are then directed over the several sets of guiding wheels 23, 43, 64, and 85 to the core wrapping and stitching device 4. As the beads pass from the tank, streams of cold water and air are ejected thereagainst by the pipes 26 and 32, respectively.

As the cores are fed into the guiding portions 72 of the lower die members 69, they are joined by strips 5 of fabric from the supply rolls 45. The strips of fabric from either the upper or the lower tier are conducted about the guide pulleys 51, 56 and 44, into the conical bore 71 of the die, and are there progressively so formed about the cores that the edges lie in overlapping relation. By reason of the grooves 74 formed in the material engaging surfaces of the die elements, a portion of the fabric is formed into longitudinally extending ridges 75 free of the core material. This I regard as a very important feature of my invention, because it obviates the possibility of the wrap material breaking or becoming weakened by the change of form of the core material during vulcanization.

The covered cores are drawn from the die between the large stitching rolls 97 and the between smaller stitching rolls 106 and then between the two large stitching rolls 93 and 97, the fabric being thereby stitched to the core at all points, except where the ridges of fabric have been formed. This result is obtained by the formation of all of the stitching rollers with central grooves 110 to receive the ridges during the stitching operation.

The several continuous lengths of covered core are conveyed between the guide wheels 134 and pressure elements 135 to the cutting table 141, where the ends are aligned and positioned against the abutment 143 in the trough, sections thereof being severed by the passage of a knife through the groove or slot 144 in the trough. As each bunch of beads is severed from the continuous lengths thereof, the operator has only to press the buttons 162 to cause an opening and closing of the bottom 153 of the trough to discharge the beads upon the truck 164. Each bead section is now formed into an annulus by bringing its ends together and applying a small piece of tape thereto. The beads are then ready to be vulcanized.

From the foregoing it will be observed that an apparatus comprising a group of related instrumentalities has been provided, by means of which clincher beads may be much more quickly manufactured and whereby the beads so formed are not liable to damage during the vulcanizing process by reason of the surplus of covering material provided in the formation of the bead.

Although I have herein specifically described but one embodiment of my invention, it is obvious that the principles thereof may be utilized to advantage in other constructions without departing from the spirit or scope of the invention, and I desire, therefore, that no limitations shall be imposed except such as are indicated in the appended claims.

What I claim is:

1. The method of forming a bead core which includes the step of enclosing the core in a strip of material and providing a longitudinally extending ridge of surplus material in such covering intermediate the edges thereof.

2. The method of forming a tire bead which includes the step of so enclosing a length of core material as to provide a longitudinal ridge of surplus material in the covering intermediate the edges thereof, and stitching all of the covering except that portion forming the ridge to the core.

3. The method of constructing beads which comprises simultaneously extruding a plurality of lengths of core material, progressively forming strips of fabric about the cores so as to form longitudinal ridges in the fabric which are free of the core, and stitching the fabric to the core between the ridges.

4. Apparatus for constructing beads for tires comprising means for extruding a continuous length of core material, means for feeding a continuous length of covering material into juxtaposition to the core and means for progressively enclosing the core in the covering material so as to provide a longitudinally extending ridge of surplus covering material intermediate the edges of the strip.

5. Apparatus for constructing beads for tires comprising means for extruding a continuous length of core material, means for feeding a continuous length of covering material into juxtaposition to the core and means for progressively enclosing the core in the covering material so as to provide spaced longitudinally extending ridges of surplus wrap material intermediate the edges of the covering material to compensate for change in form of the core material during the curing.

6. Apparatus for constructing beads for tires comprising means for extruding a continuous length of core material, means for cooling the core, means for feeding a continuous length of covering material into juxtaposition to the core, means for progressively enclosing the core in the covering material so as to provide spaced longitudinally extending ridges of surplus covering material to compensate for change of form of the core material during curing and means for stitching the portions of the material between the ridges to the core.

7. In a bead wrapping machine, a forming die having spaced longitudinal grooves in its material engaging surface.

8. In a bead wrapping machine, a forming die having a conical bore and a curved plate extending into the bore to cause an overlapping of the edges of a strip of material fed into the die.

9. In a bead wrapping machine, a die of substantially circular cross-sectional contour having a narrow longitudinally extending groove formed in the sidewall of the die passage and adapted to form a longitudinally extending ridge upon the bead cover during the passage thereof through the die.

Signed at Akron, in the County of Summit, and State of Ohio, this 9th day of September, 1927.

RAPHAEL S. KIRK.